United States Patent
Whitebread et al.

(10) Patent No.: US 6,826,976 B2
(45) Date of Patent: Dec. 7, 2004

(54) LEVER AND SHAFT ASSEMBLY AND METHOD

(75) Inventors: Richard L. Whitebread, Canton, MI (US); Heidi L. Simmons, Belleville, MI (US)

(73) Assignee: General Motors Corporation, Detroit, MI (US)

( * ) Notice: Subject to any disclaimer, the term of this patent is extended or adjusted under 35 U.S.C. 154(b) by 97 days.

(21) Appl. No.: 10/211,873

(22) Filed: Aug. 2, 2002

(65) Prior Publication Data

US 2004/0020321 A1 Feb. 5, 2004

(51) Int. Cl.$^7$ .......................... B60K 20/00; G05G 5/00; B25G 3/18; F16B 21/00; F16D 1/00
(52) U.S. Cl. ................. 74/473.28; 74/473.15; 74/527; 403/315; 403/321; 403/322.2
(58) Field of Search .................. 403/315, 316, 403/317, 321, 322.1, 322.2; 74/473.1, 473.13, 473.14, 473.15, 473.2, 473.24, 473.25, 473.26, 473.28, 527

(56) References Cited

U.S. PATENT DOCUMENTS

| | | | |
|---|---|---|---|
| 881,075 A | * | 3/1908 | Hosking ............... 408/139 |
| 4,114,401 A | * | 9/1978 | Van Hoose ............. 464/120 |
| 4,329,078 A | * | 5/1982 | Crates et al. .......... 403/316 |
| 4,936,701 A | * | 6/1990 | Allen et al. ............. 403/57 |
| 5,582,489 A | * | 12/1996 | Marzio et al. ......... 403/354 |
| 5,934,436 A | * | 8/1999 | Raszkowski et al. .... 192/219.5 |
| 6,105,473 A | * | 8/2000 | Huang ............... 81/177.75 |
| 2003/0038480 A1 | * | 2/2003 | Aeberhard ............ 285/319 |

* cited by examiner

Primary Examiner—Thomas R. Hannon
Assistant Examiner—Colby Hansen
(74) Attorney, Agent, or Firm—Leslie C. Hodges

(57) ABSTRACT

A shaft and detent assembly includes a detent lever assembly that is manually assembled on the shaft. The detent lever includes a hub which has an opening formed therein alignable with an opening formed in the shaft. A pin is inserted through the opening in both the hub and the shaft to secure the two members together for common rotation. A cylindrical retainer is assembled on the hub of the detent lever in a position to overlap or cover at least a portion of the openings in the detent lever and shaft to restrict the movement of the pin, which is secured therein during assembly. The retainer also has a plurality of spring fingers, which engage a groove formed in the hub to restrict inadvertent removal of the retainer from the assembly.

2 Claims, 1 Drawing Sheet

LEVER AND SHAFT ASSEMBLY AND METHOD

TECHNICAL FIELD

This invention relates to the assembly of levers and shafts and, more particularly, to a transmission detent lever assembled on a manual control shaft.

BACKGROUND OF THE INVENTION

Automatic shifting transmissions have a manual control lever, which has secured thereto for common rotation therewith a detent lever. The detent lever includes a detent plate, which is commonly termed a "rooster tail" due to the detent notches on the outer circumference thereof. The detent lever is secured to the manual shaft after assembly within the transmission casing.

In prior art arrangements, this assembly has been completed with various assembly mechanisms. In one prior art application, the detent lever is secured on the manual shaft with a hex nut, which may then be staked between the shaft and the nut. Another assembly method is to swage a hub portion of the detent lever onto the manual shaft. This, of course, must take place within the tight confines of the assembly within the transmission housing. The use of a hex nut requires significant attention on the part of the assembler to ensure that the nut is properly tightened and, if a staking operation is used, that it is properly staked. The use of a hub portion, which is staked to the manual shaft, requires the staking operation to take place in a small space. If excess staking force is used with this arrangement, it may cause damage to the shaft, which could then result in the need for replacement within the transmission. Also, it is known that staking operations are inconsistent. One further disadvantage of the staking operation is that this assembly is difficult. Also, after disassembly, if necessary, new components need to be used to reassemble the shaft and detent lever.

SUMMARY OF THE INVENTION

It is an object of the present invention to provide an improved detent lever and manual shaft assembly.

In one aspect of the present invention, the detent lever and manual shaft assembly each have a radial aperture or opening that are alignable at assembly.

In another aspect of the present invention, a pin member is secured within the apertures or openings of the detent lever and manual shaft.

In still another aspect of the present invention, a retainer cylinder or tube is arranged over the top of the pin after assembly into the apertures.

In a further aspect of the present invention, a retainer tube has a plurality of tab members integrally formed therewith which extend radially into a groove formed in the detent lever to retain the cylinder in a relationship covering at least a portion of the pins to prevent inadvertent removal of the pin from the openings or apertures.

In a still further aspect of the present invention, the manual shaft and detent lever assembly permits a simple assembly procedure as well as a simple disassembly procedure.

In a yet further aspect of the present invention, an improved method of assembling a manual shaft and detent lever is provided.

In a still further aspect of the present invention, a spacer, detent lever, and retainer are assembled within a transmission housing followed by assembly of the manual shaft through the spacer and detent lever assembly in a position permitting alignment of apertures in the detent lever and space in the manual shaft. A pin member is then assembled into the apertures. The retainer tube or hub is extended longitudinally relative to the shaft to cover the opening and the pin disposed therein until spring fingers on the retainer hub engage a groove on the detent lever assembly.

DESCRIPTION OF AN EXEMPLARY EMBODIMENT

Figure 1:
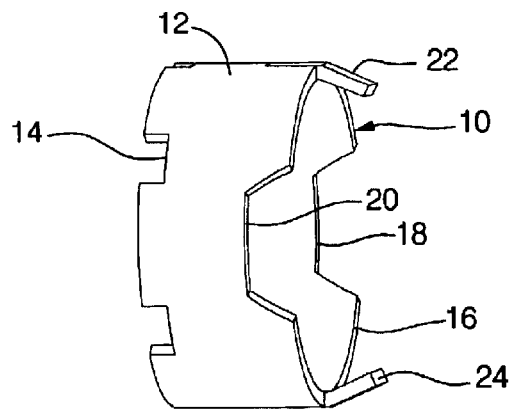
FIG. 1 is an isometric view of a retainer hub incorporating a portion of the present invention.
Figure 2:
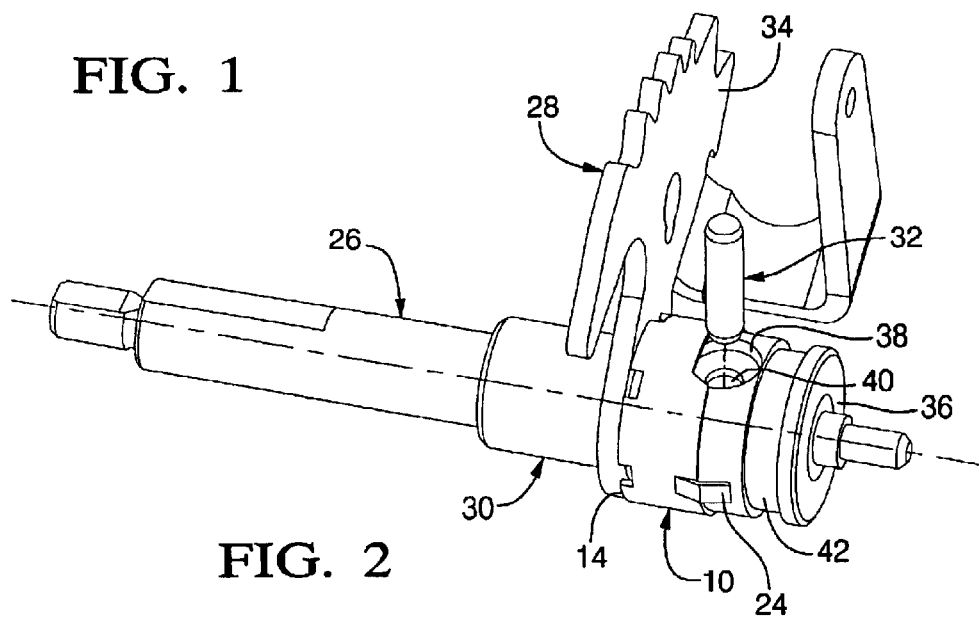
FIG. 2 is an isometric view of a manual shaft, detent lever, and retainer hub during a subassembled condition incorporating the present invention.
Figure 3:
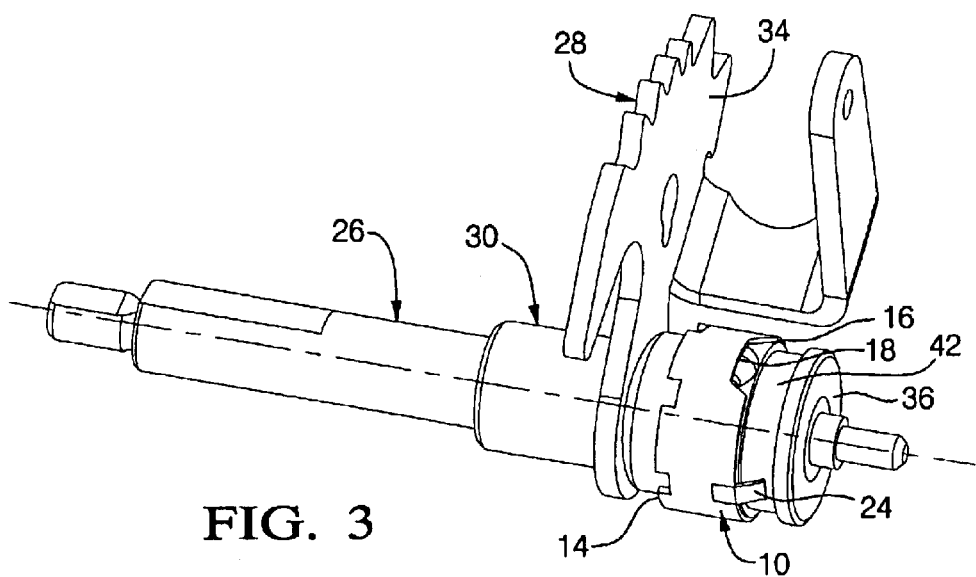
FIG. 3 is an isometric view of the finished assembly of the manual shaft, detent lever, and retainer hub incorporating the present invention.

Referring to the drawings, wherein like characters represent the same or corresponding parts throughout the several views, there is shown in FIG. 1 a retainer hub generally designated 10. The retainer hub 10 includes a tubular or cylindrical body portion 12 having a castellated surface 14 and a notched surface 16. The notched surface 16 has two notched portions 18 and 20 and two axially extending fingers or tabs 22 and 24 that are integrally formed on the cylindrical body portion 12. The retainer hub 10 is a portion of the assembly shown in FIG. 2, which also includes a manual shaft member 26, a detent lever assembly 28, a spacer 30, the retainer hub 10, and a pin 32.

The detent lever assembly 28 includes a detent plate 34, which extends radially from a hub 36. The hub 36 has an opening or aperture 38 formed radially therein which is alignable with an opening or aperture 40 formed radially in the shaft 26. During assembly of the lever and shaft, the spacer 30, detent lever assembly 28, and retainer hub 10 are assembled into a transmission case, not shown. Prior to this assembly procedure, the retainer hub 10 is moved axially along the hub 36 until the castellated surface 14 abuts the detent plate 34 and one of the notches 18 or 20 exposes the aperture 38 in the hub 36. The manual shaft 26 is then inserted through the transmission case and through the spacer 30 and the hub 36. The manual shaft is then rotated sufficiently to expose the aperture 40 to the aperture 38. At this point, the pin 32 is inserted through the apertures 38 and 40 with preferably a slight press-fit. If desired, the pin 32 may be a spring pin-type structure. When the pin 32 has been fully assembled into the apertures 38 and 40, the retainer hub 10 is urged axially along the hub 36 away from the detent plate 34 until the fingers 24 extend into a groove 42 formed in the hub 36.

The fingers 22 and 24 are essentially spring elements and therefore will engage the groove 42 as soon as the retainer hub 10 is in a position to permit their movement. When the tabs or fingers 22 and 24 are engaged within the groove 42, the cylindrical body 12 of the retainer hub 10 will at least partially cover the pin 32 that is secured within the hub 36 and the shaft 26. The pin 32 is constrained to remain within the openings 38 and 40 and prevent the inadvertent removal therefrom. During assembly, if the spring fingers or tabs 22 and 24 establish an excessive frictional force with the hub 36, an appropriate tool may be inserted into one of the castellations on the castellated end 14 to assist in positioning the retainer hub 10 properly on the hub 36.

This assembly will permit disassembly by simply removing or forcing the tabs 22 and 24 outwardly from the groove 42 and sliding the retainer hub 10 axially until the castellated surface 14 abuts the detent plate 34. At this point, the apertures 38 and 40 will, of course, be exposed and the pin 32 can be removed. The aperture 38 has a large opening end which is adjacent the outer surface of the hub 36 and a smaller inner opening which is adjacent the shaft 26. This permits ease of assembly or alignment of the pin 32 during assembly while firmly securing the pin in both the hub 36 and the shaft 26.

Obviously, many modifications and variations are possible in light of the above disclosure and the invention is to be limited only by the scope of the appended claims.

What is claimed is:

1. A detent lever and shaft assembly comprising:

a shaft having a radially extending aperture;

a detent lever assembly having a radially extending detent plate and a hub extending axially from the detent plate, said hub having a radial opening aligned with said aperture, and a circumferential groove adjacent said radial opening;

a pin extending through said opening and pressed into said opening and aperture;

a retainer having a cylindrical member disposed circumjacent said hub and at least partially covering said opening to prevent inadvertent removal of said pin from said aperture and opening, and retainer tabs integrally formed on and extending substantially axially from said cylindrical member and engaging said circumferential groove to prevent inadvertent removal of said retainer from said hub.

2. A detent lever and shaft assembly comprising;

a manual control shaft for a transmission;

a detent lever assembly having an axially extending hub mounted on said control shaft;

a pin secured in axially aligned apertures in said shaft and said hub and;

a retainer mounted on said hub and positioned by integrally formed retaining means to constrain removal of said pin from said apertures;

said hub having an annular groove and;

said means having spring fingers engaging said groove to restrict axial movement of said retainer relative to said hub.

* * * * *